United States Patent
Horibe et al.

(10) Patent No.: US 10,496,941 B2
(45) Date of Patent: Dec. 3, 2019

(54) MEDIUM STORING CONTROL PROGRAM FOR SHARING SERVICE, AND APPARATUS AND METHOD THEREFOR

(71) Applicant: FUJITSU LIMITED, Kawasaki-shi, Kanagawa (JP)

(72) Inventors: Takayuki Horibe, Kawasaki (JP); Yasuhide Matsumoto, Kawasaki (JP); Takahiro Akiyoshi, Kawasaki (JP); Yayoi Yamaguchi, Chuo (JP); Keitaro Morinaga, Chuo (JP); Atushi Masuwa, Chuo (JP)

(73) Assignee: FUJITSU LIMITED, Kawasaki (JP)

( * ) Notice: Subject to any disclaimer, the term of this patent is extended or adjusted under 35 U.S.C. 154(b) by 219 days.

(21) Appl. No.: 15/672,413

(22) Filed: Aug. 9, 2017

(65) Prior Publication Data
US 2018/0089603 A1    Mar. 29, 2018

(30) Foreign Application Priority Data
Sep. 29, 2016    (JP) .................. 2016-191893

(51) Int. Cl.
*G06F 16/176* (2019.01)
*G06Q 10/06* (2012.01)
(Continued)

(52) U.S. Cl.
CPC ..... *G06Q 10/06311* (2013.01); *G06F 16/176* (2019.01); *G06Q 30/02* (2013.01); *G06Q 30/0605* (2013.01); *G06F 3/048* (2013.01)

(58) Field of Classification Search
CPC .................. G06F 16/176; G06Q 10/06311
See application file for complete search history.

(56) References Cited

U.S. PATENT DOCUMENTS

| | | | |
|---|---|---|---|
| 2005/0065867 A1 | 3/2005 | Aisu et al. | |
| 2007/0073890 A1* | 3/2007 | Ritter ............... | G06Q 10/06 709/229 |

(Continued)

FOREIGN PATENT DOCUMENTS

| | | |
|---|---|---|
| JP | 2005-63426 A | 3/2005 |
| JP | 2015-129983 A | 7/2015 |
| JP | 2015-144010 A | 8/2015 |

OTHER PUBLICATIONS

Office Action dated Feb. 1, 2019, issued in counterpart European Patent application No. 17192592.8. (8 pages).

(Continued)

*Primary Examiner* — Kris E Mackes
(74) *Attorney, Agent, or Firm* — Westerman, Hattori, Daniels & Adrian, LLP; John P. Kong

(57) ABSTRACT

A control method for a sharing service, the method causes a computer to execute a process including: identifying, in a case where an application for a sharing service in which an operation is started by using the computer is accepted, a category of the accepted sharing service; identifying at least one management item for managing the sharing service in accordance with the identified category of the sharing service; setting the identified management item for each target article matched in the sharing service; and managing a status that is input to the set management item of the target article in accordance with the category of the sharing service.

12 Claims, 12 Drawing Sheets

(51) Int. Cl.
  *G06Q 30/02*   (2012.01)
  *G06Q 30/06*   (2012.01)
  *G06F 3/048*    (2013.01)

(56) References Cited

U.S. PATENT DOCUMENTS

| | | | |
|---|---|---|---|
| 2008/0109289 A1* | 5/2008 | Vivadelli | G06Q 10/02 |
| | | | 705/314 |
| 2009/0307605 A1* | 12/2009 | Ryan | G06Q 10/10 |
| | | | 715/751 |
| 2010/0145801 A1 | 6/2010 | Chekuri | |
| 2014/0180749 A1* | 6/2014 | Woodward | G06Q 10/06314 |
| | | | 705/7.24 |
| 2014/0258213 A1* | 9/2014 | Bank | H04L 65/403 |
| | | | 707/608 |
| 2014/0337279 A1* | 11/2014 | Mo | G06Q 10/101 |
| | | | 707/608 |
| 2014/0379509 A1 | 12/2014 | Sasa | |
| 2016/0267578 A1 | 9/2016 | Gramenov | |

OTHER PUBLICATIONS

Extended European Search Report dated Nov. 22, 2017, issued in counterpart European Application No. 17192592.8. (8 pages).

\* cited by examiner

FIG. 8

| CATEGORY | RESOURCE TYPE |
|---|---|
| RESERVATION OFFERING TYPE | VEHICLE, GOODS, SPACE, ... |
| COST MANAGEMENT OFFERING TYPE | GOODS PRODUCTION, ... |
| APPLICATION TYPE | MANPOWER, MONEY, ... |

FIG. 9

| CATEGORY | MATCHING INFORMATION MANAGEMENT ITEM | MATCHING USE STATE MANAGEMENT ITEM | CALENDAR INFORMATION MANAGEMENT ITEM |
|---|---|---|---|
| RESERVATION OFFERING TYPE | MATCHING ID, PROVIDER ID, ... | USE STATE ID, MATCHING ID, USER ID, USE STATE, ... | MATCHING ID, CALENDAR ID, USE START DATE AND TIME, USE END DATE AND TIME, ... |
| COST MANAGEMENT OFFERING TYPE | MATCHING ID, PROVIDER ID, UPPER LIMIT COST, ... | USE STATE ID, MATCHING ID, USER ID, USE STATE, USE COST, USE START DATE AND TIME, USE END DATE AND TIME, ... | MATCHING ID, CALENDAR ID, TIME OF COMMENCEMENT, TIME OF TERMINATION, TOTAL USE COST, ... |
| APPLICATION TYPE | MATCHING ID, PROVIDER ID, TARGET COST, ... | USE STATE ID, MATCHING ID, USER ID, USE STATE, APPLICATION COST, ... | — |

MEDIUM STORING CONTROL PROGRAM FOR SHARING SERVICE, AND APPARATUS AND METHOD THEREFOR

CROSS-REFERENCE TO RELATED APPLICATION

This application is based upon and claims the benefit of priority of the prior Japanese Patent Application No. 2016-191893, filed on Sep. 29, 2016, the entire contents of which are incorporated herein by reference.

FIELD

The embodiment discussed herein is related to a medium storing a control program for a sharing service, and a control apparatus and a control method therefor.

BACKGROUND

In recent days, sharing services that perform intermediary business when various resources such as vehicles, spare rooms, cloths, manpower and skills, and funds are shared by multiple persons and exchanges are conducted between individuals have been spread. In these sharing services, matching between a resource provided by a provider and a user that uses the resource is performed.

As a technology for supporting the matching, for example, a technology has been proposed in which at least one of supply information and demand information is obtained and recorded, and the matching between the supply information and the demand information is performed to transmit a result of the matching to a terminal of a supplier and a terminal of a consumer. For example, see Japanese Laid-open Patent Publication No. 2015-144010.

Since various matching targets are available in the sharing services, a variety of modes of matching managements also exist. For this reason, in a case where a common infrastructure that provides various sharing services is considered, a wide variety of management items corresponding to the various sharing services are to be prepared and managed, which is complicated.

As an aspect of the present disclosure, it is aimed at appropriately performing matching management in accordance with a category of the sharing service.

SUMMARY

According to an aspect of the invention, a control method for a sharing service, the method causes a computer to execute a process including: identifying, in a case where an application for a sharing service in which an operation is started by using the computer is accepted, a category of the accepted sharing service; identifying at least one management item for managing the sharing service in accordance with the identified category of the sharing service; setting the identified management item for each target article matched in the sharing service; and managing a status that is input to the set management item of the target article in accordance with the category of the sharing service.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of a correspondence table between categories of the sharing services and types of resources;

FIG. 9 illustrates an example of a correspondence table in which a management item is set for each category of the sharing service;

DESCRIPTION OF EMBODIMENT

Hereinafter, an exemplary embodiment according to the present disclosure will be described in detail with reference to the drawings.

Figure 1:
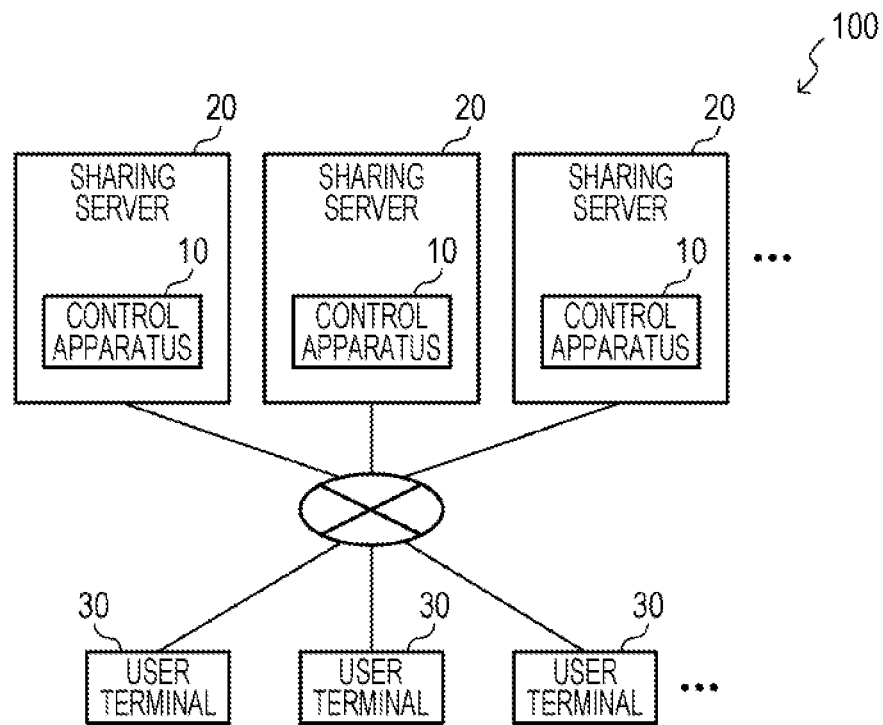
FIG. 1 is a block diagram illustrating a schematic configuration of a sharing service management system according to the present embodiment.

As illustrated in FIG. 1, a sharing service management system 100 according to the present embodiment includes a plurality of sharing servers 20 and a plurality of user terminals 30. In addition, control apparatuses 10 according to the present embodiment are mounted to the respective sharing servers 20. Each of the sharing servers 20 and each of the user terminals 30 are connected to each other via a network such as the internet. It is noted that the number of sharing servers 20 and the number of the user terminals 30 are not limited to the example of FIG. 1.

The sharing server 20 is an apparatus configured to provide a sharing service. For example, the sharing server 20 can be realized by an information processing apparatus such as a server apparatus or a personal computer. The sharing service is a service that performs intermediary business when various resources (target articles) such as vehicles, spare rooms, cloths, manpower and skills, and funds are shared by multiple persons and exchanges are conducted between individuals. According to the present embodiment, a case will be described where each of the sharing servers 20 provides the sharing service with regard to the sharing of the resource of one type each. For example, one sharing server 20 provides a vehicle assignment sharing service like Uber, and another sharing server 20 provides an accommodation facility sharing service like Airbnb. It is however noted that one physical server can also provide the sharing services of plural types in a simultaneous and parallel manner, and inversely, a plurality of servers can also provide the sharing service of the same type in some cases.

The sharing server 20 provides the sharing service via a web application or a smart phone application on the user terminal 30. In addition, the sharing server 20 accepts a matching request transmitted via the user terminal 30 from a user. The matching request refers to a request of matching from the user with respect to the resource, and the matching refers to assignment of a resource that can be used among resources provided by the providers to the user. The sharing server 20 performs the matching between the accepted matching request and the resource in cooperation with the control apparatus 10 which will be described below.

The user terminal 30 is an information processing terminal used by the provider who provides the resource of the matching target in the sharing service and the user of the resource. For example, the user terminal 30 can be realized by a personal computer, a tablet terminal, a smart phone, and the like. When an application of a desired sharing service is activated in the user terminal 30, an access is made from the user terminal 30 to the sharing server 20 that provides the relevant sharing service.

The control apparatus 10 functions as a common infrastructure for the respective sharing services provided in the sharing service management system 100. The control apparatuses 10 are mounted to the respective sharing servers 20 and perform a setting of an operation start time of the sharing service by the sharing server 20 and a management with regard to the matching in operation.

The matching targets in the sharing services include various resources, and management modes are also respectively varied such as items to be managed with regard to the matching between the matching request and the resource in accordance with a type of the resource and a manner in which the resource is used. In view of the above, according to the present embodiment, the control apparatus 10 identifies the management item of the matching in the sharing service in accordance with a category of the sharing service and manages a status that is input to the management item.

Figure 2:
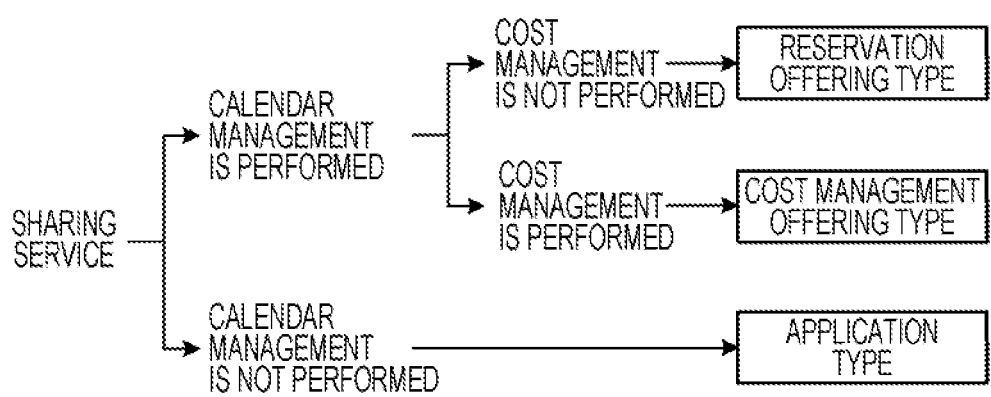
FIG. 2 is an explanatory diagram for describing a category of the sharing service.

Here, the category of the sharing service will be described. For example, as illustrated in FIG. 2, the sharing service is categorized into a case where a calendar management (duration management) is performed and a case where the calendar management is not performed. Whether or not the calendar management is performed is determined depending on whether or not the matching beyond a capacity of the resource is to be excluded in the same period or a partially overlapped period related to each resource of the matching target.

Furthermore, in a case where the calendar management is not performed, the sharing service is categorized into a case where a cost management is performed and a case where the cost management is not performed. The case where the cost management is not performed refers to a case where only one matching is associated with one resource in the same period or a partially overlapped period related to each resource of the matching target. The case where the cost management is performed refers to a case where a plurality of matchings are associated with one resource within a range that does not exceed the capacity of the resource in the same period or a partially overlapped period related to each resource of the matching target. For this reason, the cost management indicating sizes and scales of the resources used in the respective matchings is performed, for example.

Figure 3:
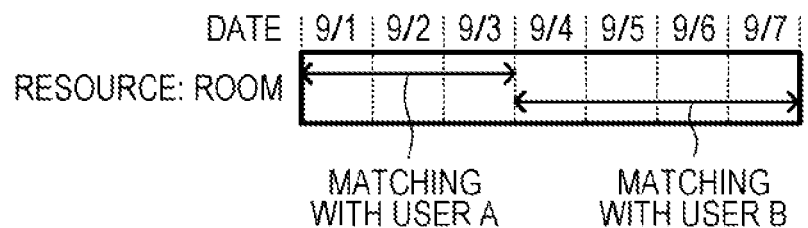
FIG. 3 is an explanatory diagram for describing a reservation offering type sharing service.

According to the present embodiment, a category of the sharing service in which the calendar management is not performed and also the cost management is not performed is referred to as "reservation offering type". For example, the vehicle assignment sharing service and the accommodation facility sharing service are relevant to the reservation offering type. For example, as illustrated in FIG. 3, in a case where the matching target is a room (accommodation facility), since different users do not redundantly use the same room in the same period, a management is to be performed on which user uses the target room in which period. It is noted that the cost management is not performed since the resource is associated with the matching on a one-to-one basis in the reservation offering type.

Figure 4:
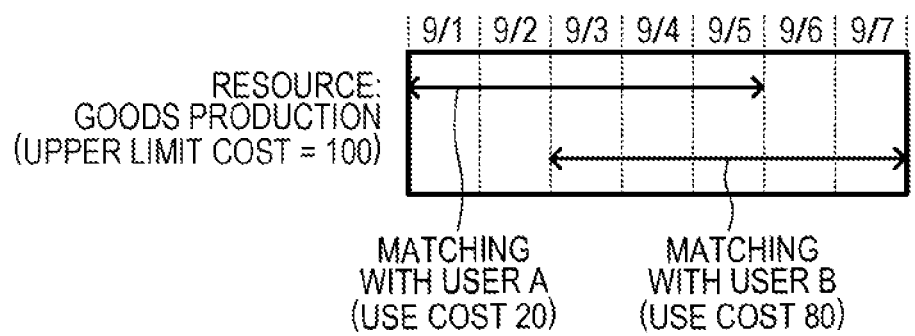
FIG. 4 is an explanatory diagram for describing a cost management offering type sharing service.

According to the present embodiment, a category of the sharing service in which the calendar management is performed and the cost management is also performed is referred to as "cost management offering type". For example, the sharing service such as goods production is relevant to the cost management offering type. For example, as illustrated in FIG. 4, a production capacity of the factory in which an upper limit of the production capacity per day is represented by cost 100 is set as the matching target. In this case, a user A can use a production capacity equivalent to cost 20, and another user B can use a production capacity equivalent to cost 80 on the same day (in the example of FIG. 4, each day of September 3 to September 5). It is however noted that, since the production capacity reaches the upper limit cost of the production capacity of the factory in this period based on the use by the user A and the use by the user B, still another user does not use the production capacity of the factory. Therefore, the management is to be performed in a manner that a total of the used costs in the same period does not exceed the upper limit cost of the resource in the cost management offering type.

Figure 5:
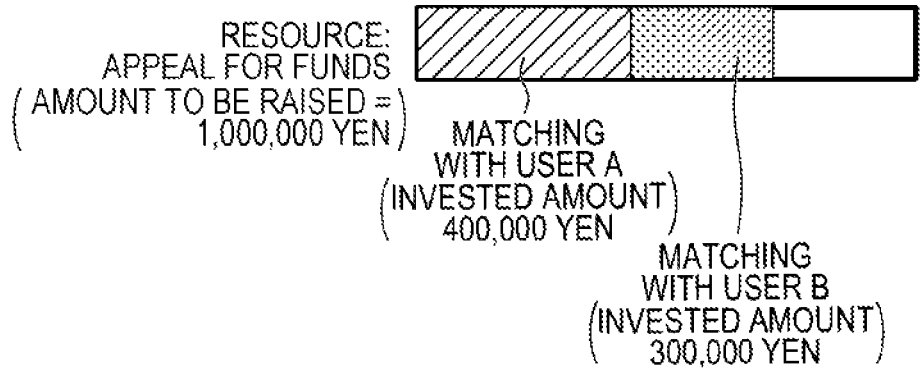
FIG. 5 is an explanatory diagram for describing an application type sharing service.

According to the present embodiment, the category of the sharing service in which the calendar management is not performed is referred to as "application type". For example, the sharing service for appealing for funds (inviting funds) and manpower is relevant to the application type. For example, as illustrated in FIG. 5, in a case where the appeal for the funds of 1,000,000 Yen that is the amount to be raised is shared, the appeal for the funds is the resource, and an investment by each user is equivalent to the use of the resource. In this case, even when the appeal period itself has a specification, but managements on the dates and periods with regard to the investments by the respective users are not performed, and managements may be performed on who makes how much for the investments, for example.

Figure 6:
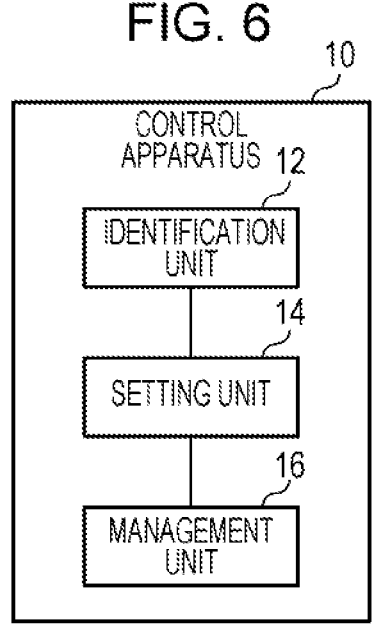
FIG. 6 is a functional block diagram of a control apparatus.

As illustrated in FIG. 6, the control apparatus 10 functionally includes an identification unit 12, a setting unit 14, and a management unit 16.

In a case where an application for a certain sharing service for starting the operation by using the computer is accepted, the identification unit 12 identifies the category of the accepted sharing service.

Figure 7:
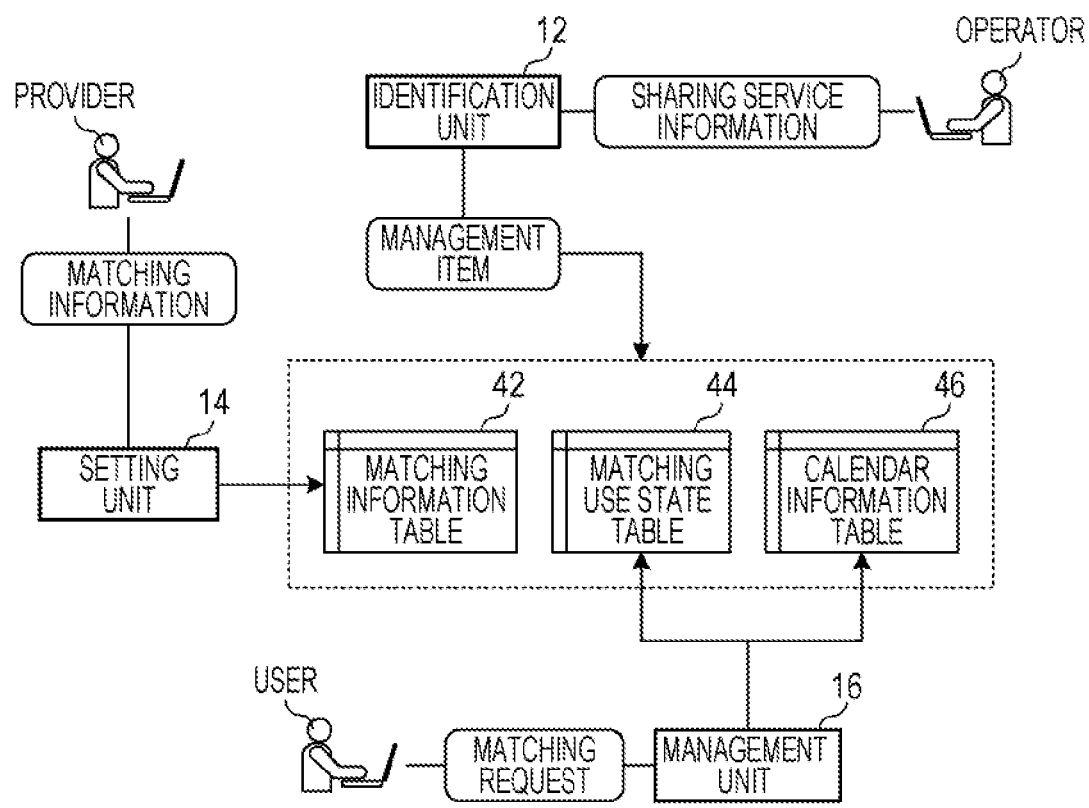
FIG. 7 is an explanatory diagram for describing respective function units of the control apparatus.

Specifically, as illustrated in FIG. 7, the identification unit 12 accepts information of the sharing service input by an operator of the sharing service as the application of the sharing service. The information of the sharing service includes, for example, information with which the category of the sharing service can be identified such as the type of the resource of the matching target in the sharing service (such as the vehicle, the accommodation facility, or the money). The identification unit 12 identifies the category of the sharing service based on the information of the accepted sharing service. For example, as illustrated in FIG. 8, a correspondence table between the categories of the sharing services and the types of the resources corresponding to the matching targets is previously prepared, and the identification unit 12 identifies the category of the sharing service based on the type of the resource of the matching target included in the accepted information. In addition, the information input by the operator may directly include the category of the sharing service as the information with which the category of the sharing service can be identified.

The identification unit 12 also identifies at least one management item for managing the sharing service in accordance with the category of the identified sharing service.

Herein, according to the present embodiment, a matching information table 42, a matching use state table 44, and a calendar information table 46 are used for the management of the sharing service as illustrated in FIG. 7. The matching information table 42 is a table in which the information related to the matching target in the sharing service is stored. The matching use state table 44 and the calendar information table 46 are tables in which a state of the matching for each resource is stored.

In a case where, specifically, the category of the identified sharing service is the "reservation offering type", the identification unit 12 identifies the management item based on the feature that the different users do not use the service redundantly in the same period. For example, the identification unit 12 identifies "use start date and time" and "use end date and time" indicating a use period of the matched resource as the management items in the calendar information table 46.

In a case where the category of the identified sharing service is the "cost management offering type", the management item based on the feature that the cost management is performed is identified. For example, the identification unit 12 identifies "upper limit cost" indicating an upper limit per unit period of the cost of the resource of the matching target as the management item in the matching information table 42. The identification unit 12 also identifies the "use cost" indicating the cost of the resource used in each matching and the "use start date and time" and the "use end date and time" in each matching indicating the use period of the resource as the management items in the matching use state table 44. Furthermore, the identification unit 12 identifies "time of commencement" and "time of termination" of the unit period and "total use cost" indicating a total of the use costs for each of the unit period as the management items in the calendar information table 46.

In a case where the category of the identified sharing service is the "application type", the management item based on the feature that the calendar management is not performed, and the funds or the manpower is provided from the user is identified. For example, the identification unit 12 identifies "target cost" of the resource of the matching target such as the amount to be raised of the funds for the appeal for or the target number of people of the manpower for the appeal as the management item in the matching information table 42. The identification unit 12 also identifies "application cost" such as the amount of invested money as the management item in the matching use state table 44.

In addition, the identification unit 12 identifies "use state" indicating a current use state of the matched resource, "provider ID" corresponding to identification information of the provider of the resource, "user ID" corresponding to identification information of the user, and the like as the management items common to the respective sharing service categories.

It is noted that, as illustrated in FIG. 9, for example, the identification unit 12 refers to a correspondence table in which the management items used for each table is set for each category of the sharing service and can identify the management item in accordance with the category of the sharing service.

The setting unit 14 sets the management item identified by the identification unit 12 for each resource of the matching target in the sharing service with regard to each of the sharing service categories.

Specifically, as illustrated in FIG. 7, the setting unit 14 accepts information of the resource of the matching target (hereinafter, which will be referred to as "matching information") from the provider of the resource. The matching information includes information corresponding to the management item managed in the matching information table 42. The setting unit 14 assigns "matching ID" corresponding to the identification information of the matching information to each accepted matching information. In addition, the setting unit 14 creates the matching information table 42 including the management item identified by the identification unit 12 as the management item in the matching information table 42 and the "matching ID". Furthermore, the setting unit 14 sets the information corresponding to the matching information in the respective management items of the matching information table 42. It is noted that, in a case where the matching information includes information other than the management item of the matching information table 42, an item may be additionally set in the matching information table 42. For example, the matching information may include detailed information of the resource or information such as an accepting rule of the matching request from the user.

The setting unit 14 also creates the matching use state table 44 and the calendar information table 46 using the management items identified by the identification unit 12 by being associated with the respective matching information tables 42. The management item "matching ID" is associated with a key in each of the tables. It is noted that, in a case where the category is the "application type", since the calendar management is not performed, the calendar information table 46 is not created.

Specifically, the setting unit 14 assigns a use state ID to the matching use state table 44 for each matching and sets a status indicating that the resource can be used in the management item "use state" as an initial value of the use state. The setting unit 14 also prepares a blank table with regard to the calendar information table 46.

The management unit 16 manages the statuses input to the management items of the respective tables set by the setting unit 14 in accordance with the category of the sharing service. Specifically, the management unit 16 accepts the matching request from the user as illustrated in FIG. 7. The information included in the matching request varies in accordance with the category of the sharing service of the target.

For example, in the case of the "reservation offering type" sharing service, the matching request includes a user ID, the use start date and time, the use end date and time, the matching ID indicating the matching information corresponding to the request target of the matching, and the like. It is noted that, in a case where the matching request does not include the use start date and time, the matching request is a matching request for requesting the immediate use of the resource.

In the case of the "cost management offering type" sharing service, the matching request includes the user ID, the use start date and time, the use end date and time, the use cost, the matching ID of the request target, and the like. In the case of the "application type" sharing service, the matching request includes the user ID, the application cost, the matching ID of the request target, and the like.

The management unit 16 searches for the matching use state table 44 and the calendar information table 46 by using the matching ID included in the accepted matching request as the key and determines whether or not the relevant resource can be matched with respect to the matching request.

Specifically, a case will be considered where the matching request is a matching request for requesting the immediate use of the "reservation offering type" sharing service. In this case, the management unit 16 determines whether or not the status of the "use state" of the matching use state table 44 associated with the matching ID of the request target is a status indicating that the resource can be used. The management unit 16 determines that the matching can be performed in a case where the status indicates that the resource can be used and also the calendar information table 46 associated with the matching ID of the request target does not include the calendar information including the period until the use end date and time included in the matching request.

In addition, a case will be considered where the matching request is a reservation based on the "reservation offering type" sharing service (the use start date and time is in future). In this case, the management unit 16 determines that the matching can be performed in a case where the target period of the matching request does not exist in the calendar information table 46 corresponding to the matching ID of the request target.

Moreover, a case will be considered where the matching request is a request for the "application type" sharing service. In this case, the management unit 16 determines that the matching can be performed in a case where the status indicating that the resource can be used is stored in the "use state" of the matching use state table 44 corresponding to the matching ID of the request target.

Furthermore, a case will be considered where the matching request is a request for the "cost management offering type" sharing service. In this case, the management unit 16 obtains the "total use cost" of the target period of the matching request and the "upper limit cost" of the matching information table 42 in the calendar information table 46 corresponding to the matching ID of the request target. Then, the management unit 16 determines that the matching can be performed in a case where the "use cost" included in the matching request is lower than or equal to ("upper limit cost"–"total use cost").

In a case where it is determined that the matching can be performed with respect to the accepted matching request, the management unit 16 uses the information included in the matching request to update the matching use state table 44 and the calendar information table 46. Specifically, the management unit 16 changes the status of the "use state" in the matching use state table and also registers the calendar information corresponding to the new matching in the calendar information table 46. It is noted that, in a case where the category is the "application type", since the calendar information table 46 does not exist, the update of the calendar information table 46 is not performed.

Furthermore, for example, in a case where the use is actually started from the reservation state of the resource, a case where the use of the resource is ended, or the like, when the use cost of the resource is changed, the management unit 16 updates the "use state" of the matching use state table 44.

Figure 10:
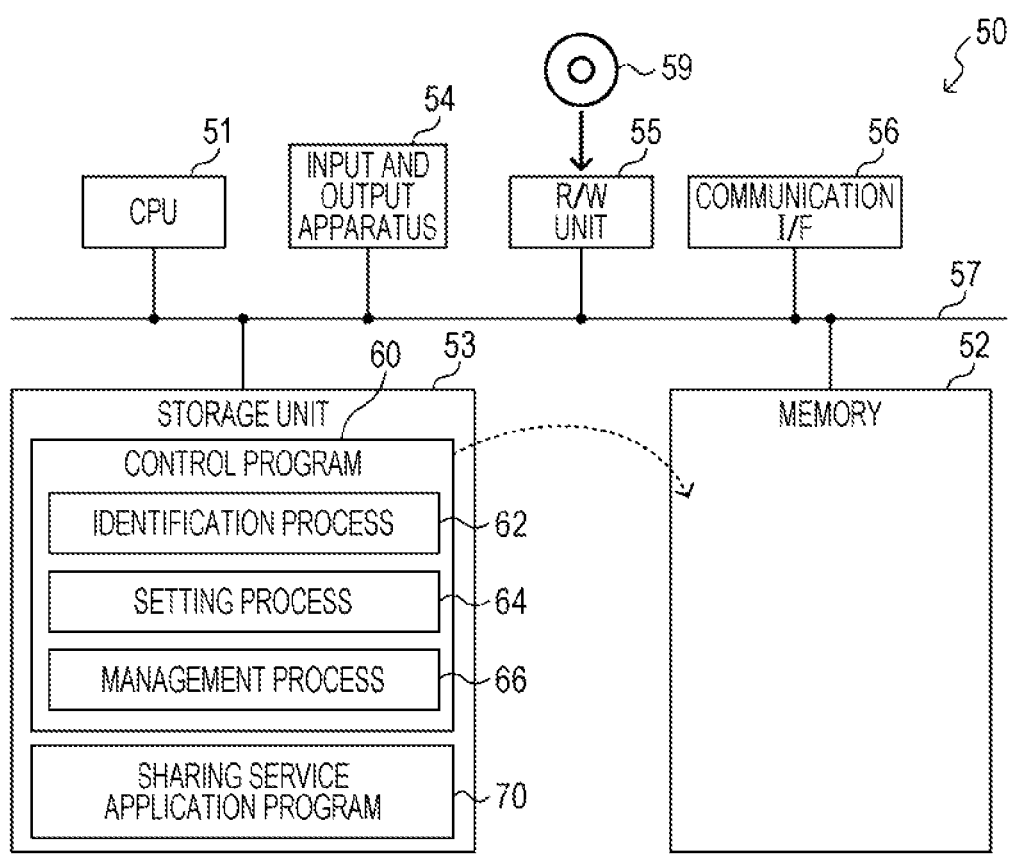
FIG. 10 is a block diagram illustrating a schematic configuration of a computer functioning as a sharing server according to the present embodiment.

The sharing server 20 can be realized, for example, by a computer 50 illustrated in FIG. 10. The computer 50 is provided with a central processing unit (CPU) 51, a memory 52 as a temporary storage area, and a non-volatile storage unit 53. In addition, the computer 50 is provided with an input and output apparatus 54, a read/write (R/W) unit 55 configured to control read and write of data with respect to a portable storage medium 59, and a communication interface (I/F) 56 connected to a network such as the internet. The CPU 51, the memory 52, the storage unit 53, the input and output apparatus 54, the R/W unit 55, and the communication I/F 56 are connected with one another via a bus 57.

The storage unit 53 is realized by a hard disk drive (HDD), a solid state drive (SSD), a flash memory, or the like. The storage unit 53 as the storage medium stores a control program 60 functioning as the control apparatus 10 and a sharing service application program 70 for causing the computer 50 to function as the sharing server 20 in cooperation with the control program 60. The control program 60 functions as a common infrastructure for various sharing services. The sharing service application program 70 provides functions in accordance with applications of the respective sharing services such as release of information and acceptance of information from the user.

The control program 60 includes identification process 62, setting process 64, and management process 66.

The CPU 51 reads out the control program 60 from the storage unit 53 to be developed into the memory 52 and sequentially executes processes of the control program 60. When the CPU 51 executes the identification process 62, the CPU 51 operates as the identification unit 12 illustrated in FIG. 6. In addition, when the CPU 51 executes the setting process 64, the CPU 51 operates as the setting unit 14 illustrated in FIG. 6. Moreover, when the CPU 51 executes the management process 66, the CPU 51 operates as the management unit 16 illustrated in FIG. 6. In addition, the CPU 51 reads out the sharing service application program 70 from the storage unit 53 to be developed into the memory 52 and sequentially executes processes of the sharing service application program 70. As a result, the computer 50 that executes the control program 60 and the sharing service application program 70 functions as the sharing server 20. It is noted that the part functioning when the computer 50 executes the control program 60 is equivalent to the control apparatus 10.

It is noted that the function realized by the control program 60 can also be realized, for example, by a semiconductor integrated circuit, or more specifically, an application specific integrated circuit (ASIC) or the like.

Next, an action of the sharing service management system 100 according to the present embodiment will be described.

Figure 11:
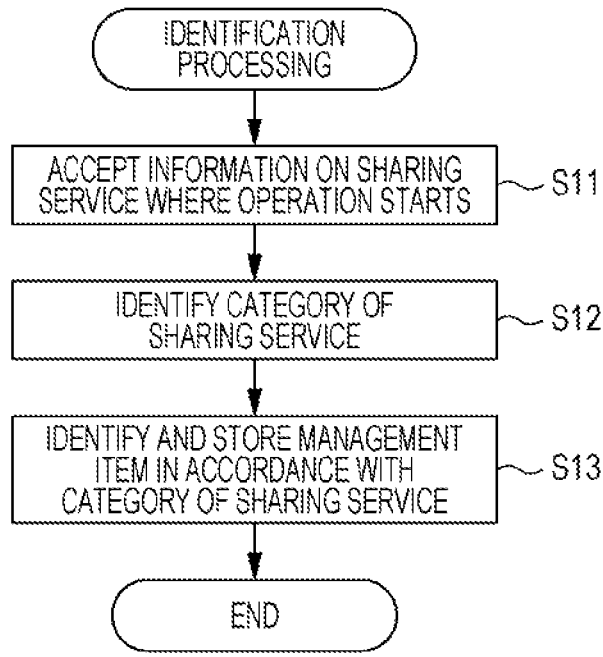
FIG. 11 is a flow chart illustrating an example of identification processing.

First, when the operator who starts the operation of the sharing service inputs the information of the sharing service including the information with which the category of the sharing service where the operation starts can be identified to the sharing server 20, the control apparatus 10 executes the identification processing illustrated in FIG. 11. Then, during the operation of the sharing service, when the matching information is transmitted from the provider of the resource to the sharing server 20 via the user terminal 30, the control apparatus 10 executes the setting processing illustrated in FIG. 12. In addition, during the operation of the sharing service, when the matching request is transmitted from the user who desires to use the resource to the sharing server 20 via the user terminal 30, the control apparatus 10 executes the management processing illustrated in FIG. 16. Hereinafter, each of the identification processing, the setting processing, and the management processing will be described in detail.

In step S11 of the identification processing illustrated in FIG. 11, the identification unit 12 accepts the information of the sharing service transmitted from the operator. Next, in step S12, the identification unit 12 identifies the category of the sharing service based on the information of the accepted sharing service. Next, in step S13, the identification unit 12 refers, for example, to the correspondence table illustrated in FIG. 9 and identifies the management item used in each of the tables in accordance with the category of the sharing service. The identification unit 12 stores the identified management item in a predetermined storage area so as to correspond to identification information of the target sharing service. Then, the identification processing is ended.

Figure 12:
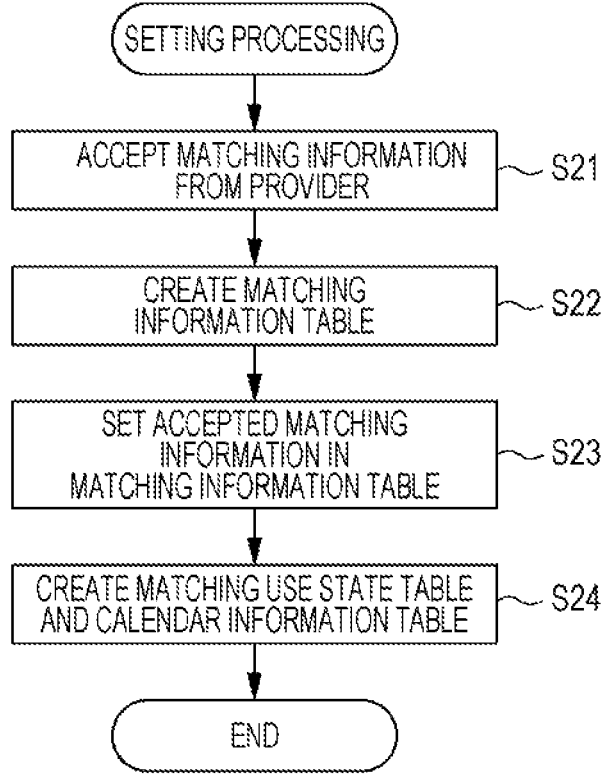
FIG. 12 is a flow chart illustrating an example of setting processing.

Next, in step S21 of the setting processing illustrated in FIG. 12, the setting unit 14 accepts the matching information transmitted from the provider of the resource. Next, in step S22, the setting unit 14 assigns the "matching ID" to the accepted matching information. Then, the setting unit 14 creates the matching information table 42 including the management item identified by the identification unit 12 as the management item in the matching information table 42 and the "matching ID". Next, in step S23, the setting unit 14 sets the corresponding information of the accepted matching information in the respective management items of the created matching information table 42.

Next, in step S24, the setting unit 14 creates the matching use state table 44 using the management item identified by the identification unit 12 and the blank calendar information table 46 while being associated with the respective matching information tables 42. The setting unit 14 sets a status indicating the service can be used that in the "use state" of the matching use state table 44 as an initial value of the use state. Then, the setting processing is ended.

Figure 13:
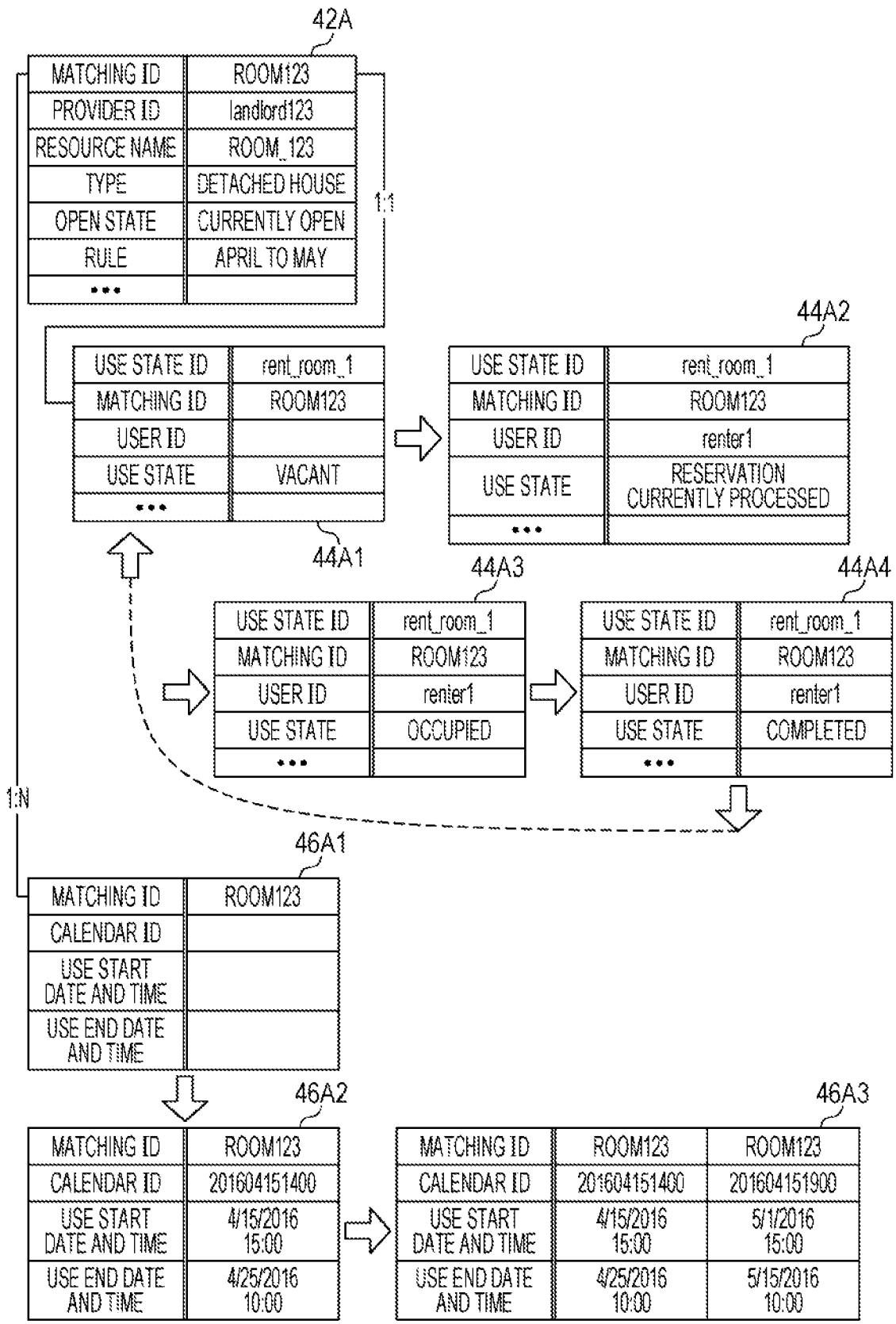
FIG. 13 is an explanatory diagram for describing management items of the reservation offering type sharing service.

For example, in the case of the sharing service for the room which is categorized into the "reservation offering type", a matching information table 42A, a matching use state table 44A1, and a calendar information table 46A1 as illustrated, for example, in FIG. 13 are created, and the matching information is set. It is noted that, in the example of the matching information table 42A of FIG. 13, items including "resource name", "type", "open state", "rule" are items other than the management item identified by the identification unit 12. In addition, "vacant", "reservation currently processed", "occupied", and "completed" are used as statuses of the "use state" in a matching use state table 44A in the example of FIG. 13, and "vacant" is a status where the matching can be performed.

In the case of the sharing service for the production of goods categorized into the "cost management offering type", for example, a matching information table 42B, a matching use state table 44B1, and a calendar information table 46B1 are created. It is noted that "100/week" of the "upper limit cost" in the matching information table 42B in FIG. 14 indicates that the matching can be performed up to cost 100 per week as illustrated, for example, in FIG. 14. In the example of the matching information table 42A in FIG. 14, the "resource name" and "cost unit" are items other than the management item identified by the identification unit 12. The "cost unit" indicates a unit of the use cost of the matching accepted by the matching request. In addition, in the example of FIG. 14, "not used", "in preparation", "in production", and "completed (which is not illustrated in FIG. 14)" are used as statuses of the "use state" in a matching use state table 44B.

Figure 15:
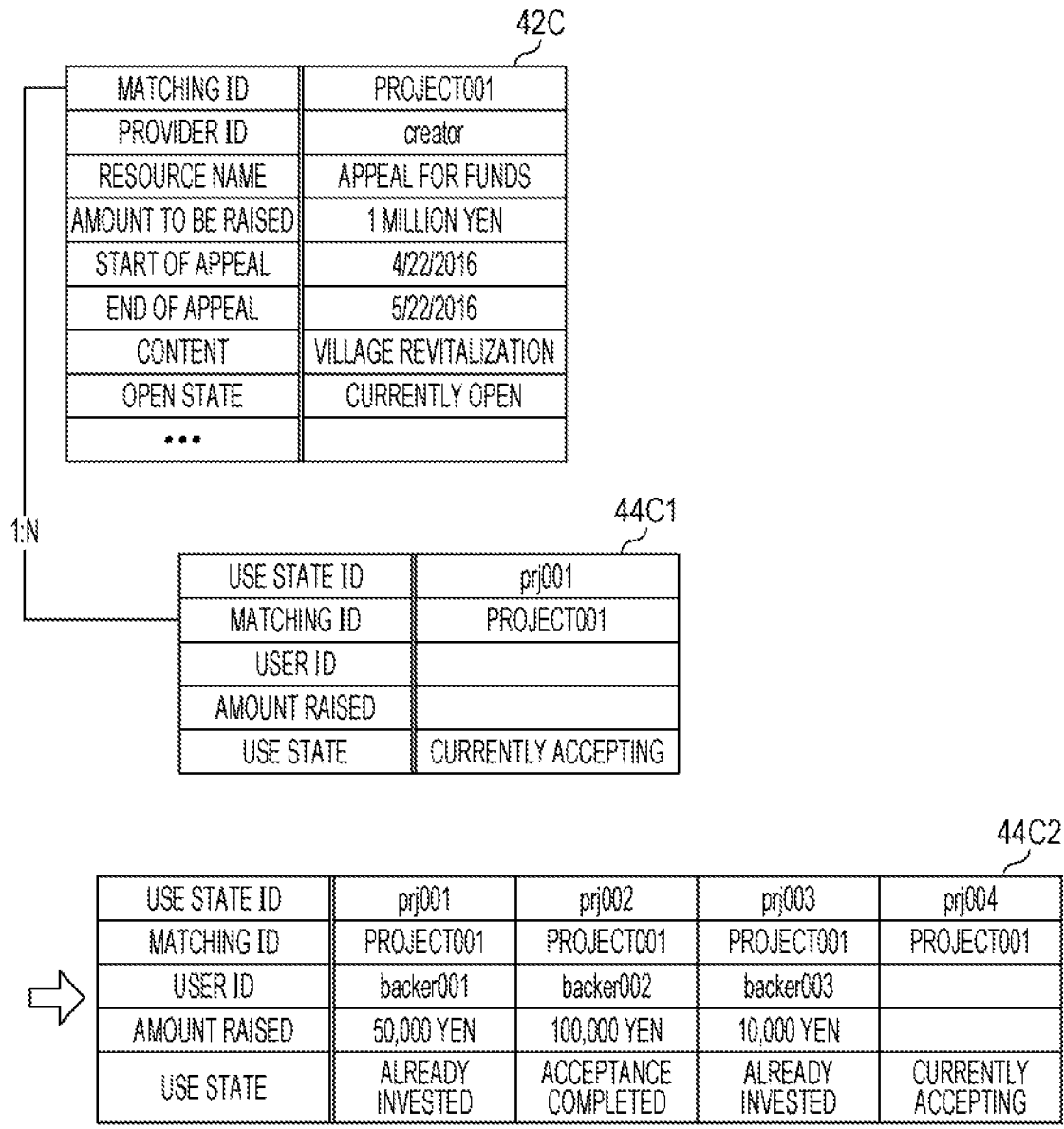
FIG. 15 is an explanatory diagram for describing management items of the application type sharing service.

In addition, for example, in the case of the sharing service for the fund appeal categorized into the "application type", a matching information table 42C and a matching use state table 44C1 are created as illustrated, for example, in FIG. 15. It is noted that the "amount to be raised" in the matching information table 42C in FIG. 15 is an example of "target cost". In the example of the matching information table 42C in FIG. 15, "resource name", "start of appeal", "end of appeal", "content", and "open state" are items other than the management item identified by the identification unit 12. In addition, in the example of FIG. 15, "currently open", "acceptance completed", "already invested", and "appeal closed (which is not illustrated in FIG. 15)" are used as statuses of the "use state" in a matching use state table 44C.

Figure 16:
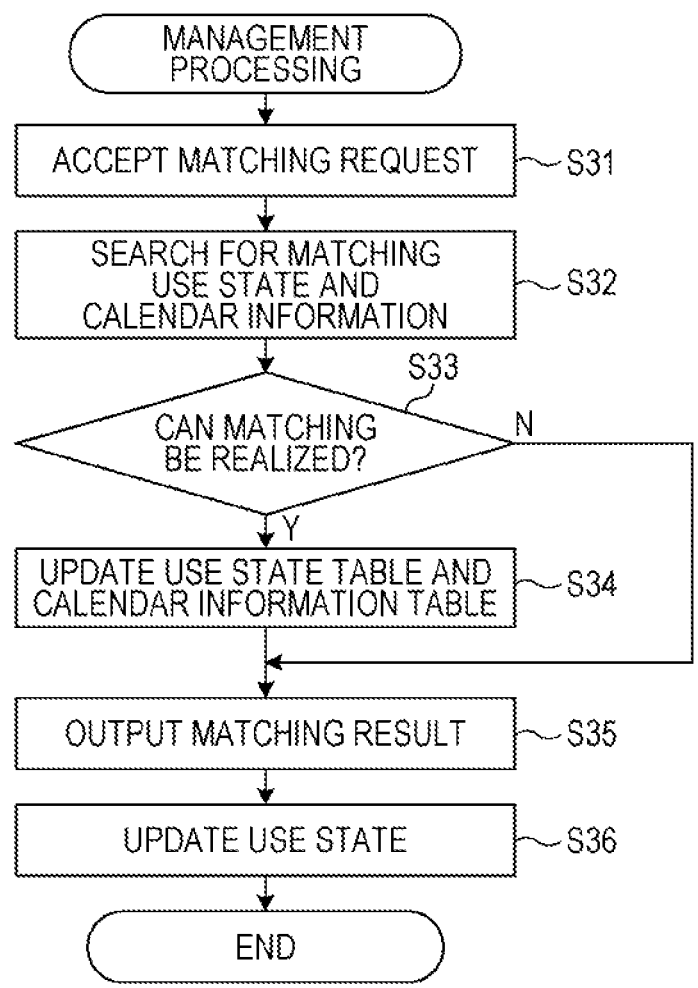
FIG. 16 is a flow chart illustrating an example of management processing.

Next, in step S31 of the management processing illustrated in FIG. 16, the management unit 16 accepts the matching request transmitted from the user who desires to use the resource. Next, in step S32, the management unit 16 searches for the matching use state table 44 and the calendar information table 46 by using the matching ID included in the accepted matching request as the key. Next, in step S33, the management unit 16 determines whether or not the relevant resource can be matched with respect to the matching request. In a case where the matching can be performed, the processing shifts to step S34, and in a case where the matching is not performed, the processing shifts to step S35.

In step S34, the management unit 16 changes the status of the "use state" of the matching use state table 44 and also registers the calendar information corresponding to the new matching in the calendar information table 46.

In step S35, the management unit 16 outputs the matching result to an application of the sharing service. In a case where the matching can be performed, the application executes processing of asking the user to confirm the matching or billing an expense. In a case where the matching is not performed, the user is notified of that effect.

Next, in step S36, in a case where the management unit 16 obtains the change in the use cost of the resource from the notification from the application or the input from the provider or the user, the management unit 16 updates the "use state" of the matching use state table 44 based on the obtained content. Then, the management processing is ended.

The management processing of the reservation offering type sharing service will be described by using the example of the sharing service for the room illustrated in FIG. 13. A case will be considered where the matching request accepted by the management unit 16 requests the immediate use of the sharing service (without the specification of the use start date and time). In this case, the management unit 16 searches the matching use state table 44A for the matching ID of the request target and refers to the management item "use state". As illustrated in the matching use state table 44A1 in FIG. 13, in a case where the "use state" is "vacant", the management unit 16 changes the status of the "use state" to "reservation currently processed" as illustrated in a matching use state table 44A2. Then, the management unit 16 determines whether or not the calendar information including the period until the use end date and time included in the matching request exists in a calendar information table 46A associated with the matching ID of the request target. In a case where the above-mentioned calendar information does not exist in the calendar information table 46A, the management unit 16 determines that the matching can be performed.

The management unit 16 also assigns a calendar ID to the use start date and time and the use end date and time to be registered in the calendar information table 46A2 while being associated with the matching ID of the request target. In the case of the matching request for requesting the immediate use of the sharing service (without the specification of the use start date and time), the current date and time are used as the "use start date and time", and the information included in the matching request is used as the "use end date and time".

When the notification of the matching confirmation by the user, the completion of the payment of the expense, or the like is made from the application, the management unit 16 changes the status of the "use state" to "occupied" as illustrated in a matching use state table 44A3 of FIG. 13. When the "use end date and time" registered in the calendar information table 46A1 elapses, the management unit 16 updates the status of the "use state" to "completed" as illustrated in a matching use state table 44A4. It is noted that a configuration may be adopted in which the status of the "use state" is changed to "occupied" and "completed" in a case where the user or the provider instructs the start and completion of the actual stay via the application. Furthermore, after a predetermined period of time elapses since the status of the "use state" is changed to "completed" or the provider performs the instruction via the application, for example, the management unit 16 changes the status of the "use state" from "completed" to "vacant".

A case will be considered where the use start date and time included in the matching request are future date and time, that is, the management unit 16 accepts the matching request for an accommodation reservation. In this case, the management unit 16 determines whether or not the status of the "use state" in the matching use state table 44A is "reservation currently processed". In the case of the "reservation currently processed" status, since the matching period by other users is not confirmed, the management unit 16 determines that the matching is not performed. In a case where the status of the "use state" is other than the "reservation currently processed" status, the management unit 16 determines whether or not the calendar information including a period from the use start date and time included in the matching request until the use end date and time exists in the calendar information table 46A associated with the matching ID of the request target. The management unit 16 determines that the matching can be performed in a case where the above-mentioned calendar information does not exist. Then, the management unit 16 registers the calendar information corresponding to the matching request in the calendar information table 46A3.

When the notification of the matching confirmation by the user, the completion of the payment of the expense, or the like is made from the application, the management unit 16 changes the status of the "use state" in the matching use state table 44A to "vacant". When the "use start date and time" of the recent calendar information registered in the calendar information table 46A3 elapses, the management unit 16 updates the status of the "use state" in the matching use state table 44A to "occupied". The changes in the status from "occupied"→"completed"→"vacant" are similar to the case of the immediate use.

Figure 14:
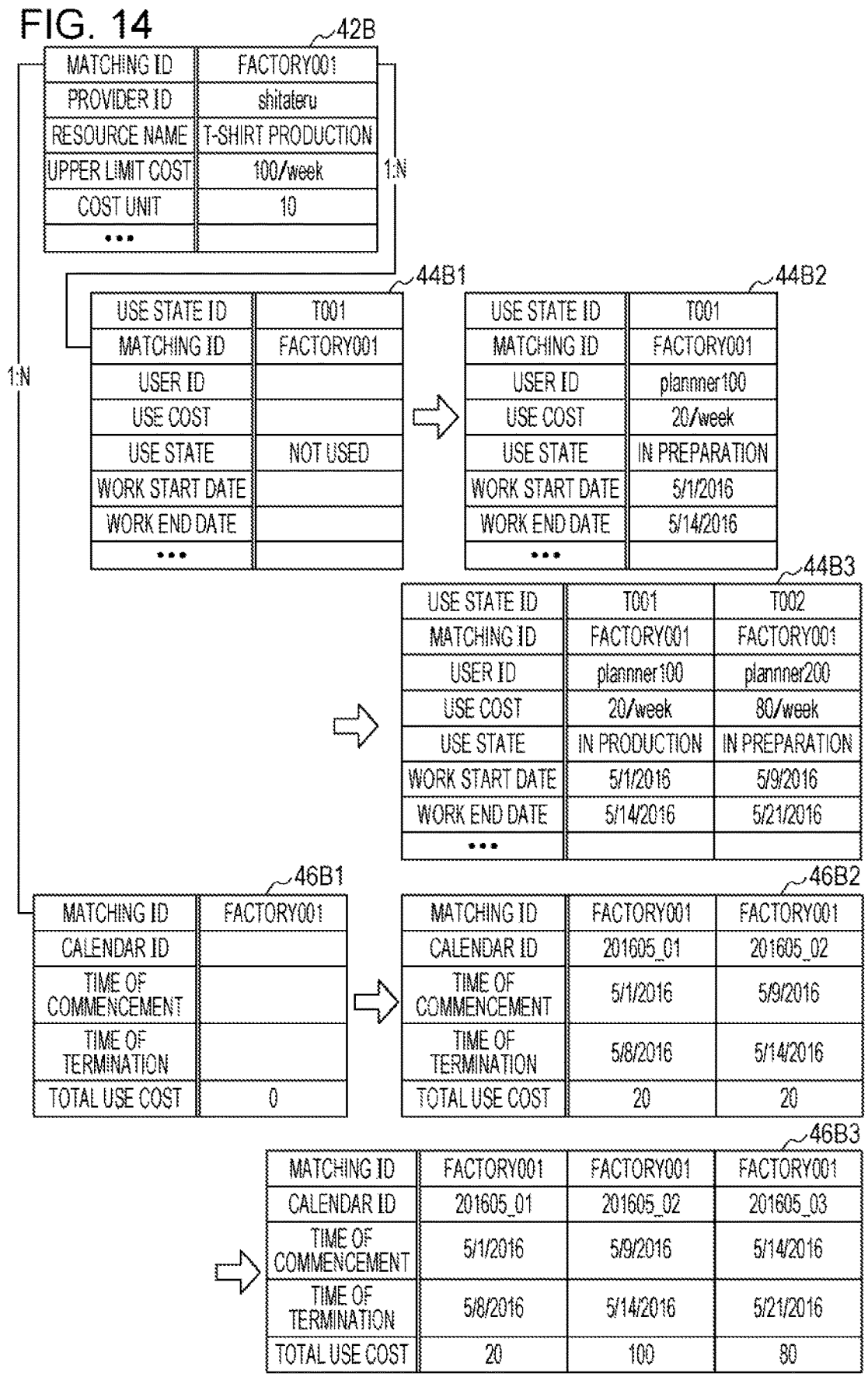
FIG. 14 is an explanatory diagram for describing management items of the cost management offering type sharing service.

Next, the management processing of the cost management offering type sharing service will be described by using the example of the sharing service for the goods production illustrated in FIG. 14. When the management unit 16 accepts the matching request, the management unit 16 refers to the "use state" in the matching use state table 44B associated with the matching ID of the request target. In a case where the status of the "use state" is "not used", the management unit 16 compares the "upper limit cost" in the matching information table 42B with the "use cost" included in the matching request. The management unit 16 determines that the matching can be performed in a case where the "use cost" does not exceed the "upper limit cost".

The management unit 16 registers the information included in the matching request and sets the status of the "use state" as "in preparation" as illustrated in the matching use state table 44B2. Then, the management unit 16 creates calendar information in which the period from the work start date until the work end date included in the matching request is divided into unit period in conformity to the definition of the "upper limit cost" of the matching information to be registered in a calendar information table 46B2. In the case of FIG. 14, the unit period is one week, and the period specified by the matching request is two weeks, so that the matching request is divided into one week each. When it has passed the work start date, the management unit 16 updates the status of the "use state" to "in production" in a case where the instruction is accepted from the provider or the like. Similarly, when it has passed the work end date, the management unit 16 updates the status of the "use state" to "completed" in a case where the instruction is accepted from the provider or the like.

A case will be considered where the status of the "use state" when the matching request is accepted is other than "not used". In this case, the management unit 16 obtains the "total use cost" of the calendar information including the period from the work start date until the work end date included in the matching request from a calendar information table 46B associated with the matching ID of the request target. Then, the management unit 16 determines that the matching can be performed in the case of ("upper limit cost"−"total use cost")≥"use cost". A case will be considered where the work period is a period overlapped with the period registered in the calendar information in a state of the calendar information table 46B2 in FIG. 15 and also the matching request including the use cost=80 is accepted by the management unit 16. In this case, (upper limit cost 100−total use cost 20)≥use cost 80 is established, and it is determined that the matching can be performed. The management unit 16 registers the information of the matching request in the matching use state table 44B3 and also registers the calendar information in the calendar information table 46B3. At this time, in a case where the already registered calendar information is overlapped with the unit period, the management unit 16 adds the "use cost" of the new matching request to the "total use cost" of the already registered calendar information.

Next, the management processing of the application type sharing service will be described by using the example of the sharing service for the appeal for the funds illustrated in FIG. 15. When the matching request is accepted, the management unit 16 refers to the "use state" corresponding to the latest "use state ID" in the matching use state table 44C1 associated with the matching ID of the request target. In a case where the status of the "use state" is "currently open", the management unit 16 determines that the matching can be performed, and in a case where the status is "application cutoff", the management unit 16 determines that the matching is not performed.

In a case where the matching can be performed, the management unit 16 registers the information of the accepted matching request in the matching use state table 44C2 so as to correspond to the latest "use state ID" and updates the status of the "use state" to "acceptance completed". Then, the management unit 16 adds the record of the new "use state ID" in which the status of the "use state" is "currently open" to the matching use state table 44C2.

When the notification of the completion of the payment from the user or the like is accepted from the application, the management unit 16 updates the status of the "use state" to "already invested". When it has passed the "end of appeal" of the matching information table 42C, the management unit 16 updates the status of the "use state" corresponding to the latest "use state ID" of the matching use state table 44C to "appeal closed" in a case where the instruction is made from the user or the like. In addition, in a case where the total of "amount raised" of the matchings in which the status of the "use state" in the matching use state table 44C is "already invested" exceeds the "amount to be raised" in the matching information table 42C, the management unit 16 may update the status to "appeal closed".

As described above, with the control apparatus according to the present embodiment, the management item in accordance with the category of the sharing service is identified, and the status is managed, so that it is possible to perform the appropriate management in accordance with the category of the sharing service.

Figure 17:
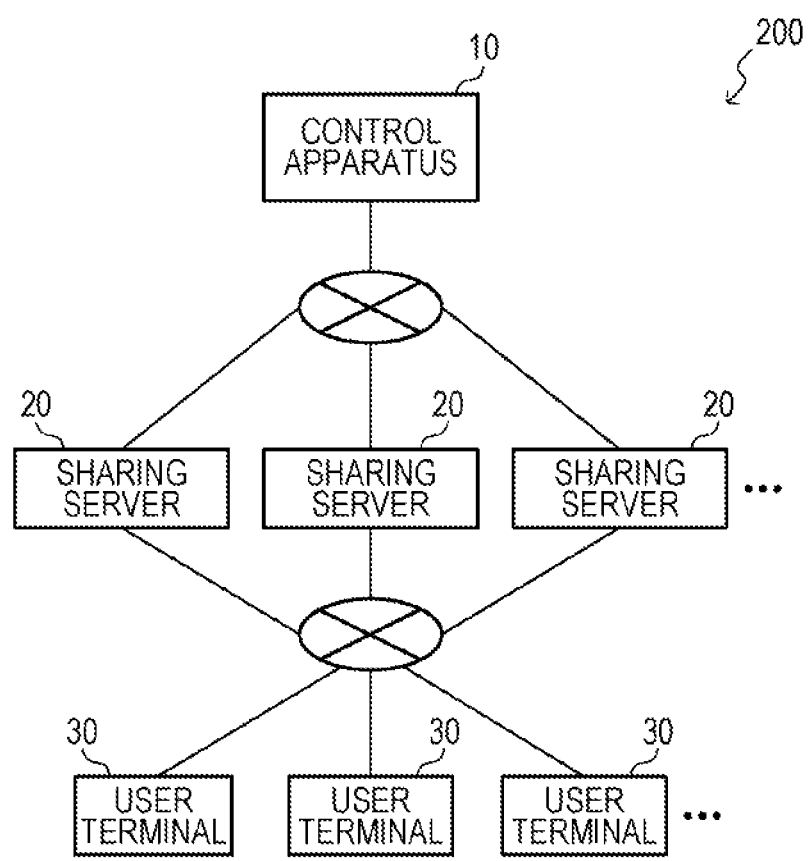
FIG. 17 is a block diagram illustrating another example of a sharing server management system.
Figure 18:
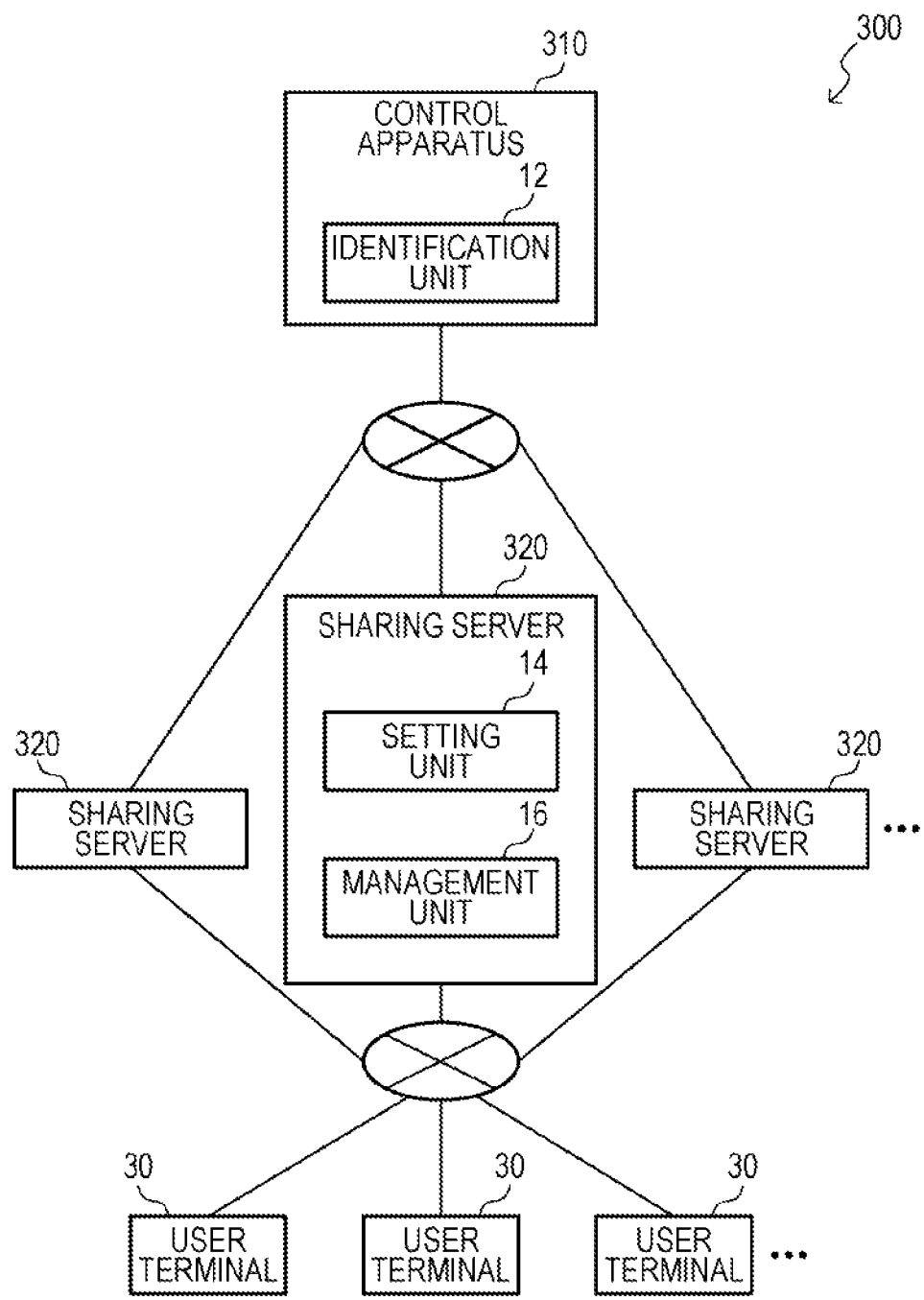
FIG. 18 is a block diagram illustrating another example of the sharing server management system.

It is noted that the case where the control apparatuses 10 are mounted to the respective sharing servers 20 has been described according to the above-mentioned embodiment, the configuration is not limited to this. For example, the control apparatus 10 is separately installed to be away from the respective sharing servers 20, and the control apparatus 10 may be connected with the respective sharing servers 20 via a network such as the internet like a sharing server management system 200 illustrated in FIG. 17. In addition, a control apparatus 310 may include the identification unit 12, and a sharing server 320 may include the setting unit 14 and the management unit 16 like a sharing server management system 300 illustrated in FIG. 18. In this case, when the operation of the sharing service is started, the operator transmits the information of the sharing service to the control apparatus 310 from the sharing server 320 or the like. The management item in accordance with the category of the sharing service is returned from the control apparatus 310. Then, the setting unit 14 and the management unit 16 may be operated in the sharing server 320 by using the management item returned from the control apparatus 310 to operate the sharing service.

In addition, the mode has been described above in which the control program 60 is previously stored (installed) in the storage unit 53, but the configuration is not limited to this. The program can also be provided in a mode in which the program is stored in the storage medium such as a CD-ROM, a DVD-ROM, or a USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A computer-readable non-transitory storage medium that stores a control program for causing a computer to execute a process comprising:
   identifying, in a case where an application for a sharing service in which an operation is started by using the computer is accepted, a category of the accepted sharing service;
   identifying at least one management item for managing the sharing service in accordance with the identified category of the sharing service;
   setting the identified management item for each matching target article in the sharing service; and
   managing a status that is input to the set management item of the target article in accordance with the category of the sharing service,
   wherein the category includes a first category where one matching can be performed with respect to one target article in a same period or partially overlapped periods related to each matching target article, a second category where plural matchings can be performed with respect to one target article in the same period or the partially overlapped periods related to each matching target article, and a third category where appealing for use of the target article is performed.

2. The storage medium according to claim 1,
   wherein the first category includes a use period and a use state as the management items, and
   wherein, when a matching request is accepted, in a case where a period of a request target and the use period are the same period or the period of the request target is overlapped with part of the use period, and a currently managed matching where a status of the use state indicates that the matching is being performed exists, it is determined that the matching corresponding to the matching request is not performed.

3. The storage medium according to claim 1,
   wherein the second category includes a use period, an upper limit cost of the target article that can be used, and a use cost of the target article used in each matching as the management items, and
   wherein, when a matching request is accepted, in a case where a period of a request target and the use period are the same period or the period of the request target is overlapped with part of the use period, and a total of the use costs of currently managed matchings does not exceed the upper limit cost, it is determined that the matching corresponding to the matching request can be performed.

4. The storage medium according to claim 1,
   wherein the third category includes an appealing state for the use of the target article as the management item, and
   wherein, when a matching request is accepted, in a case where the appealing state indicates that the use of the target article is being appealed, it is determined that the matching corresponding to the matching request can be performed.

5. A control apparatus for a sharing service, the control apparatus comprising:
   a memory; and
   a processor coupled to the memory and configured to execute a process including;

identifying, in a case where an application for the sharing service in which an operation is started is accepted, a category of the accepted sharing service, identifying at least one management item for managing the sharing service in accordance with the identified category of the sharing service, setting the identified management item for each target article matched in the sharing service, and managing a status that is input to the set management item of the target article in accordance with the category of the sharing service, wherein the category includes a first category where one matching can be performed with respect to one target article in a same period or a partially overlapped period related to each matching target article, a second category where plural matchings can be performed with respect to one target article in the same period or the partially overlapped period related to each matching target article, and a third category where appealing for use of the target article is performed.

6. The control apparatus according to claim 5, wherein the first category includes a use period and a use state as the management items, and wherein, in the managing, when a matching request is accepted, in a case where a period of a request target and the use period are the same period or the period of the request target is overlapped with part of the use period, and a currently managed matching where a status of the use state indicates that the matching is being performed exists, it is determined that the matching corresponding to the matching request is not performed.

7. The control apparatus according to claim 5, wherein the second category includes a use period, an upper limit cost of the target article that can be used, and a use cost of the target article used in each matching as the management items, and wherein, in the managing, when a matching request is accepted, in a case where a period of a request target and the use period are the same period or the period of the request target is overlapped with part of the use period, and a total of the use costs of currently managed matchings does not exceed the upper limit cost, it is determined that the matching corresponding to the matching request can be performed.

8. The control apparatus according to claim 5, wherein the third category includes an appealing state for the use of the target article as the management item, and wherein, in the managing, when a matching request is accepted, in a case where the appealing state indicates that the use of the target article is being appealed, it is determined that the matching corresponding to the matching request can be performed.

9. A control method for a sharing service, the method causes a computer to execute a process comprising:

identifying, in a case where an application for a sharing service in which an operation is started by using the computer is accepted, a category of the accepted sharing service;

identifying at least one management item for managing the sharing service in accordance with the identified category of the sharing service;

setting the identified management item for each target article matched in the sharing service; and managing a status that is input to the set management item of the target article in accordance with the category of the sharing service, wherein the category includes a first category where one matching can be performed with respect to one target article in a same period or a partially overlapped period related to each matching target article, a second category where plural matchings can be performed with respect to one target article in the same period or the partially overlapped period related to each matching target article, and a third category where appealing for use of the target article is performed.

10. The control method according to claim 9, wherein the first category includes a use period and a use state as the management items, and wherein, when a matching request is accepted, in a case where a period of a request target and the use period are the same period or the period of the request target is overlapped with part of the use period, and a currently managed matching where a status of the use state indicates that the matching is being performed exists, it is determined that the matching corresponding to the matching request is not performed.

11. The control method according to claim 9, wherein the second category includes a use period, an upper limit cost of the target article that can be used, and a use cost of the target article used in each matching as the management items, and wherein, when a matching request is accepted, in a case where a period of a request target and the use period are the same period or the period of the request target is overlapped with part of the use period, and a total of the use costs of currently managed matchings does not exceed the upper limit cost, it is determined that the matching corresponding to the matching request can be performed.

12. The control method according to claim 9, wherein the third category includes an appealing state for the use of the target article as the management item, and wherein, when a matching request is accepted, in a case where the appealing state indicates that the use of the target article is being appealed, it is determined that the matching corresponding to the matching request can be performed.

* * * * *